United States Patent
Tahara et al.

(10) Patent No.: US 8,229,654 B2
(45) Date of Patent: Jul. 24, 2012

(54) DEVICE FOR LIMITING OUTPUT OF INTERNAL COMBUSTION ENGINE WHEN THE ENGINE HAS ABNORMALITY

(75) Inventors: Jun Tahara, Toyota (JP); Mitsuhiro Nada, Toyota (JP); Hiroki Kinuhata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 292 days.

(21) Appl. No.: 12/678,915

(22) PCT Filed: Sep. 19, 2008

(86) PCT No.: PCT/JP2008/067006
§ 371 (c)(1),
(2), (4) Date: Mar. 18, 2010

(87) PCT Pub. No.: WO2009/038186
PCT Pub. Date: Mar. 26, 2009

(65) Prior Publication Data
US 2010/0211286 A1    Aug. 19, 2010

(30) Foreign Application Priority Data
Sep. 21, 2007   (JP) ................................ 2007-245693

(51) Int. Cl.
*B60T 7/12* (2006.01)
*G05D 1/00* (2006.01)
(52) U.S. Cl. .................................... 701/107; 123/198 D
(58) Field of Classification Search .................. 701/107, 701/54, 62, 104, 112, 114; 123/395, 396, 123/397, 398, 399, 400, 198 D
See application file for complete search history.

(56) References Cited

U.S. PATENT DOCUMENTS

| | | | |
|---|---|---|---|
| 5,533,491 A | 7/1996 | Gras et al. | |
| 6,009,853 A | 1/2000 | Fujikawa et al. | |
| 2002/0066435 A1 | 6/2002 | Okamoto | |
| 2004/0214687 A1 | 10/2004 | Morisawa et al. | |
| 2005/0079953 A1* | 4/2005 | Zieles et al. | 477/185 |
| 2006/0157026 A1 | 7/2006 | Ishida et al. | |
| 2007/0251502 A1* | 11/2007 | Takayanagi et al. | 123/458 |

FOREIGN PATENT DOCUMENTS

| | | |
|---|---|---|
| JP | 7506886 T | 7/1995 |
| JP | 08303289 A | 11/1996 |
| JP | 09088702 A | 3/1997 |
| JP | 10153142 A | 6/1998 |

(Continued)

*Primary Examiner* — Mahmoud Gimie
(74) *Attorney, Agent, or Firm* — Gifford, Krass, Sprinkle, Anderson & Citkowski, P.C.

(57) ABSTRACT

An output restriction device for restricting engine output when a drive power output system for an internal combustion engine has an abnormality is provided. The output restriction device includes an abnormality detection unit, and initial restriction unit, and a secondary restriction unit. The abnormality restriction unit detects an abnormality in the drive power output system. The initial restriction unit restricts a tolerable range of the engine output to a first restriction region when the abnormality detection unit detects an abnormality in the drive power output system. A secondary restriction unit shifts the tolerable range of the engine output to a second restriction region, which has an upper limit lower than that of the first restriction region, in accordance with an operation history of the engine after the initial restriction unit restricts the tolerable range of the engine output to the first restriction region.

16 Claims, 11 Drawing Sheets

FOREIGN PATENT DOCUMENTS

| | | |
|---|---|---|
| JP | 10159620 A | 6/1998 |
| JP | 11148406 A | 6/1999 |
| JP | 2002195083 A | 7/2002 |
| JP | 2002276450 A | 9/2002 |
| JP | 2003094987 A | 4/2003 |
| JP | 2003262151 A | 9/2003 |
| JP | 2006194164 A | 7/2006 |

* cited by examiner

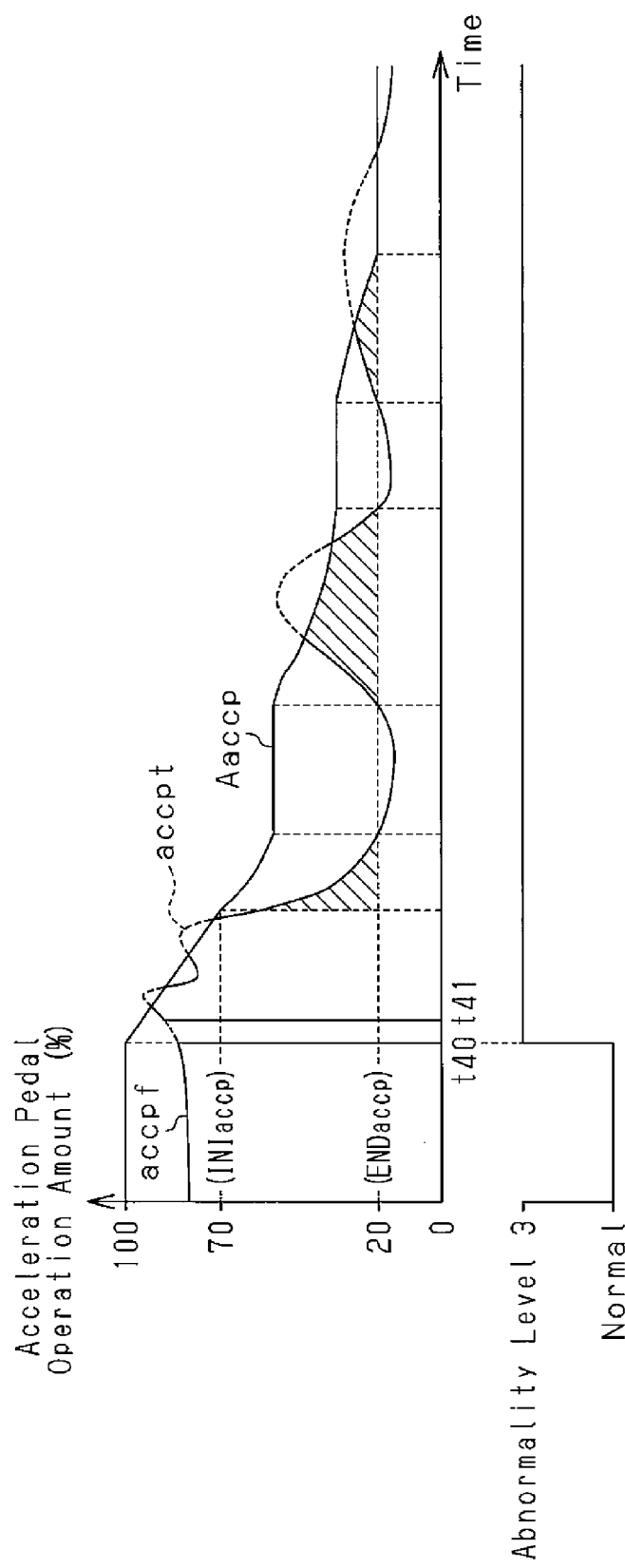

DEVICE FOR LIMITING OUTPUT OF INTERNAL COMBUSTION ENGINE WHEN THE ENGINE HAS ABNORMALITY

CROSS-REFERENCE TO RELATED APPLICATIONS

This application is the U.S. national phase of PCT/JP2008/067006 filed Sep. 19, 2008, which claims priority of Japanese Patent Application No. 2007-245693 filed Sep. 21, 2007.

FIELD OF THE INVENTION

The present invention relates to a device for restricting engine output when a drive power output system for an internal combustion engine has an abnormality.

BACKGROUND OF THE INVENTION

A known device restricts engine output when a drive power output system for an internal combustion engine has an abnormality. For example, patent document 1 discloses a device that lowers the engine output by restricting fuel injection amounts when there is an abnormality to enable a vehicle evacuation travel while protecting the internal combustion engine.

Patent Document 1: Japanese Laid-Open Patent Publication No. 10-159620 (pp. 4 to 5, FIG. 2).

However, in the output restriction device disclosed in patent document 1, when there is an abnormality in the drive power output system, the output of the internal combustion engine decreases suddenly as the operation state of the internal combustion engine shifts to a state enabling the vehicle evacuation travel. Thus, if an abnormality is detected in an internal combustion engine mounted on a vehicle when the vehicle is being accelerated in an overtake lane, the driver may feel greatly uncomfortable since the output greatly decreases even though the driver is accelerating the vehicle.

To solve this problem, the output may be restricted in a manner that it does not greatly decrease when there is an abnormality. In this case, however, an output state that is not suitable for the internal combustion engine may continue for a long period depending on how the driver operates the vehicle. Continuation of such an unsuitable state over a long period may further advance the abnormality such that the internal combustion engine cannot continue to operate. As a result, the vehicle may not be able to complete the evacuation travel.

SUMMARY OF THE INVENTION

It is an object of the present invention to provide an output restriction device that prevents a driver from feeling uncomfortable and allows the vehicle to complete an evacuation travel when an abnormality occurs in a drive power output system for an internal combustion engine.

To achieve the above object, one aspect of the present invention provides an output restriction device for restricting engine output when a drive power output system for an internal combustion engine has an abnormality is provided. The output restriction device includes an abnormality detection unit, an initial restriction unit, and a secondary restriction unit. The abnormality restriction unit detects an abnormality in the drive power output system. The initial restriction unit restricts a tolerable range of the engine output to a first restriction region when the abnormality detection unit detects an abnormality in the drive power output system. The secondary restriction unit shifts the tolerable range of the engine output to a second restriction region, which has an upper limit lower than that of the first restriction region, in accordance with an operation history of the engine after the initial restriction unit restricts the tolerable range of the engine output to the first restriction region.

BRIEF DESCRIPTION OF THE DRAWINGS

FIG. 14 is a timing chart showing one example of an output controlling process according to a further embodiment.

DETAILED DESCRIPTION OF THE PREFERRED EMBODIMENTS

First Embodiment

Figure 1:
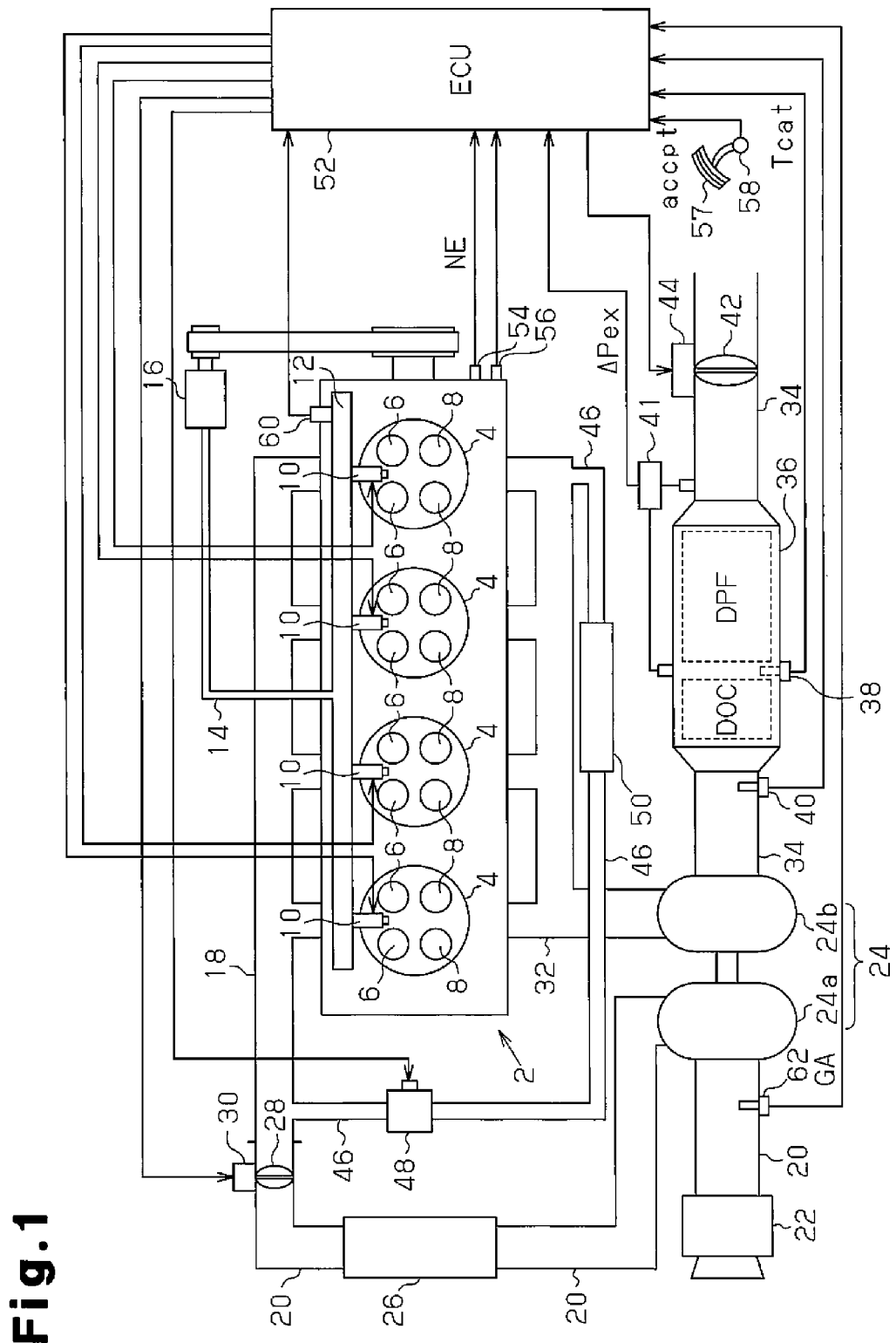
FIG. 1 is a schematic block diagram showing the structure of a drive power output system for an internal combustion engine according to the present invention.

Referring to FIG. 1, a diesel engine (hereinafter simply referred to as the engine) 2 is an internal combustion engine for driving a vehicle. The engine 2 has cylinders 4, each including intake valves 6, exhaust valves 8, and a fuel injection valve 10, which directly injects fuel into a combustion chamber. The fuel injection valve 10 is in communication with a common rail 12, in which fuel is pressurized to a predetermined pressure and accumulated. The common rail 12 is in communication via a fuel supply tube 14 with a fuel pump 16, which is driven by the engine 2.

An intake manifold 18, which is in communication with the combustion chamber of each cylinder 4 via an intake port, is connected to an intake pipe 20. The intake pipe 20 has an upstream end connected to an air cleaner 22. A compressor 24a for a turbo charger 24 is arranged in the intake pipe 20. An intercooler 26, which cools the hot intake air that has been compressed by the compressor 24a, is arranged at downstream from the intake pipe 20 of the compressor 24a. An intake air throttle valve 28, which throttles the amount of intake air, is arranged in a portion of the intake pipe 20 that is downstream from the intercooler 26. An electric actuator 30 adjusts the opening of the intake air throttle valve 28.

An exhaust manifold 32, which is in communication with the combustion chamber of each cylinder 4 via an exhaust port, is connected to an exhaust pipe 34. A turbine 24b of the turbo charger 24 and an exhaust purifier 36 are arranged in the exhaust pipe 34. The exhaust purifier 36 includes an oxidation catalyst (DOC) and a particulate filter (DPF), and a catalyst bed temperature sensor 38 is arranged between the DOC and the DPF to detect the temperature inside the exhaust purifier 36. An exhaust gas temperature sensor 40 is arranged in the exhaust pipe 34 at the upstream side of the exhaust purifier 36 to detect the temperature of the exhaust gas flowing into the exhaust purifier 36. The exhaust pipe 34 includes an exhaust gas difference pressure sensor 41, which checks the exhaust gas pressure at the upstream side of the DPF and the exhaust gas pressure at the downstream side of the DPF to detecting a difference $\Delta Pex$ between the exhaust gas pressures. An exhaust gas throttle valve 42, which adjusts the exhaust gas flow amount, is arranged in the exhaust pipe 34 at the downstream side of the exhaust purifier 36. An actuator 44 opens and closes the exhaust gas throttle valve 42.

The intake manifold 18 draws in some of the exhaust gas flowing through the exhaust manifold 32 from an exhaust gas recirculating passage (EGR passage) 46. An EGR valve 48, which adjusts the amount of the EGR gas flowing through the EGR passage 46, is arranged in the EGR passage 46. An EGR cooler 50, which cools the EGR gas, is arranged in the EGR passage 46 at the upstream side of the EGR valve 48.

The engine 2 includes an electronic control unit (ECU) 52, which controls the engine operation state. The ECU 52, which controls the engine 2 in accordance with the engine operation state and requests from the driver, is formed centered around a microcomputer including a CPU, a ROM, a RAM, a backup RAM, and the like.

The catalyst bed temperature sensor 38, the exhaust gas temperature sensor 40, and the exhaust gas difference pressure sensor 41, which have been described above, are connected to the ECU 52. The ECU 52 is also connected to a crank position sensor 54 that detects crankshaft rotation speed (engine speed NE) of the engine 2, a coolant temperature sensor 56 that detects the engine coolant temperature, and an acceleration pedal operation amount sensor 58 that detects the operation amount accpt of the acceleration pedal (accelerator) 57. The ECU 52 is further connected to a fuel pressure sensor 60 that detects the fuel pressure of the common rail 12, an intake air amount sensor 62 that detects the intake air amount GA, and other sensors and switches. The output signals of the various sensors and switches are input to the ECU 52.

The ECU 52 is electrically connected to the fuel injection valve 10, the EGR valve 48, the actuator 30 for the intake air throttle valve 28, and the actuator 44 for the exhaust gas throttle valve 42. The ECU 52 outputs an output signal that drives and controls each mechanism.

Figure 2:
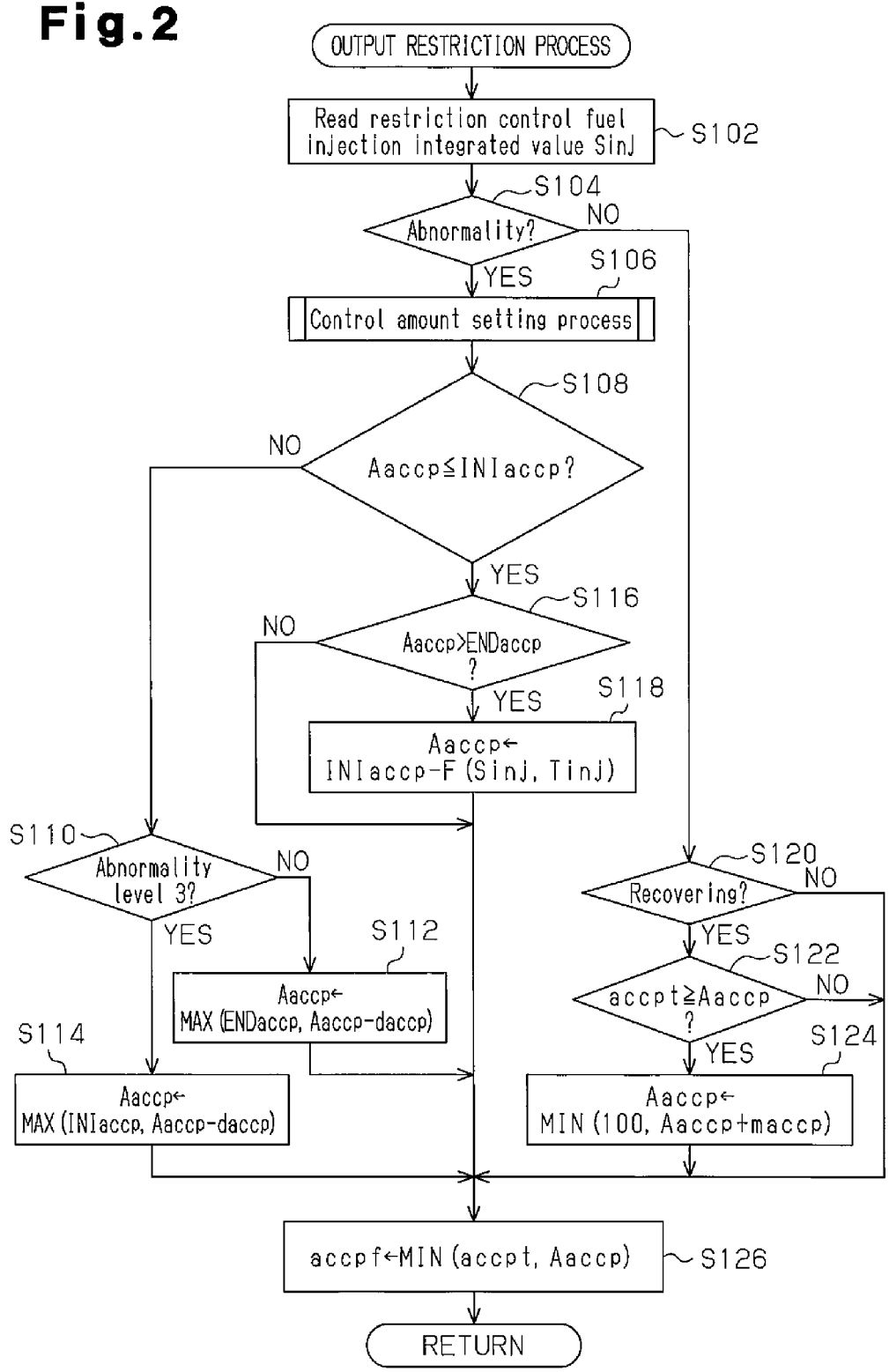
FIG. 2 is a flowchart of an output restricting process according to a first embodiment executed by an ECU shown in FIG. 1.

An output restricting process executed by the ECU 52 when the engine has an abnormality will now be discussed. FIG. 2 shows a flowchart of the output restricting process. This process is executed in interrupts of constant time cycles.

First, in step S102, a fuel injection integrated value Sinj for restricting control is read by a work region set in a memory of the ECU 52. The fuel integrated value Sinj is calculated through a fuel integrated value Sinj calculation process shown in FIG. 3. The fuel integrated value Sinj calculation process is executed in interrupts whenever fuel is injected by the fuel injection valve 10. Since the engine 2 of the present embodiment is a four-cylinder, the process is executed in interrupts for every 180° CA (crank angle).

Figure 3:
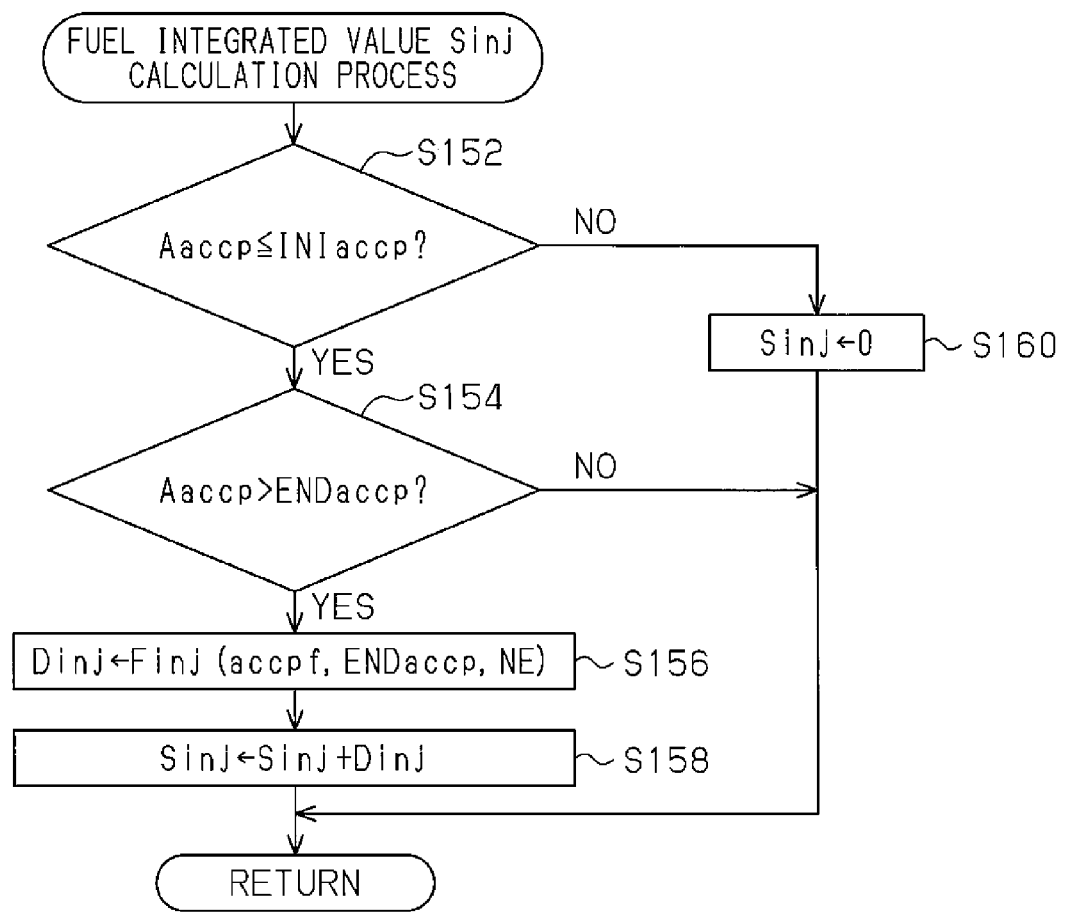
FIG. 3 is a flowchart of a fuel integrated value Sinj calculation process shown in FIG. 2.

The fuel integrated value Sinj calculation process of FIG. 3 will now be discussed. First, in step S152, it is determined whether or not an acceleration pedal operation amount restriction value Aaccp is less than or equal to an initial restriction value INIaccp. The acceleration pedal operation amount restriction value Aaccp is used to restrict the acceleration pedal operation amount accpt to a final acceleration pedal operation amount accpf that corresponds to the actual output. In the present embodiment, the initial restriction value INIaccp is a restriction value that is set when the engine 2 has an abnormality. The initial restriction value INIaccp is set in an abnormality level 3, which will be described later, and is cleared in other abnormality levels 1 and 2. The initial restriction value INIaccp indicates the upper limit position of a first restriction region that avoids the engine 2 from becoming immediately inoperable when there is an abnormality in the engine 2.

Accordingly, when the abnormality of the engine 2 is either abnormality level 1 or 2, in which the initial restriction value INIaccp is cleared, Aaccp>INIaccp is satisfied in step S152. Thus, the fuel integrated value Sinj is cleared in step S160, and the present routine is terminated.

When the abnormality of the engine 2 is abnormality level 3, the initial restriction value INIaccp is set, as will be described later. Thus, in step S152, the currently set acceleration pedal operation amount restriction value Aaccp and the initial restriction value INIaccp are compared. If Aaccp≦INIaccp is satisfied in step S152, it is determined whether or not the acceleration pedal operation amount restriction value Aaccp is greater than a final restriction value ENDaccp in step S154. The final restriction value ENDaccp indicates the final converging restriction value for each abnormality level that allows the vehicle to continue an evacuation travel and is set for each abnormality level, as will be described later. In other words, the final restriction value ENDaccp indicates the upper limit position of a second restriction region that allows for the vehicle to continue the evacuation travel over a long period of time even when there is an abnormality in the drive power output system.

In step S156, when Aaccp>ENDaccp is satisfied, a final restriction excess fuel amount Dinj is calculated based on the final acceleration pedal operation amount accpf, the final restriction value ENDaccp, and the engine speed NE, as shown in expression 1.

$$Dinj \rightarrow Finj(accpf, ENDaccp, NE) \quad \text{[Expression 1]}$$

Here, the fuel injection amount M (mm3/st) corresponding to the final acceleration pedal operation amount accpf, which is set in accordance with the engine speed NE, and the fuel injection amount N (mm3/st) corresponding to the final restriction value ENDaccp, which is set in accordance with the engine speed NE, are calculated. The difference (M−N) is calculated by Finj (accpf, ENDaccp, NE), which represents a function. In other words, the amount in which the fuel injection amount corresponding to the final acceleration pedal operation amount accpf exceeds the fuel injection amount corresponding to the final restriction value ENDaccp is calculated as the final restriction excess fuel amount Dinj.

In the following step S158, the final restriction excess fuel amount Dinj is integrated to calculate the fuel integrated value Sinj. In other words, the final restriction excess fuel amount Dinj is added to the current fuel integrated value Sinj and the sum is set as a new fuel integrated value Sinj, as shown in expression 2.

$$Sinj \rightarrow Sinj + Dinj \quad \text{[Expression 2]}$$

The present routine is temporarily terminated after the process of step S158 is terminated.

Even when the engine 2 is in abnormality level 3, if Aaccp>INIaccp is satisfied in step S152, the fuel integrated value Sinj is cleared in step S160 and the present routine is terminated. Even if Aaccp≦INIaccp is satisfied in step S152, when Aaccp≦ENDaccp is satisfied in step S154, the present routine is terminated.

As described above, the process of step S158 in which the final restriction excess fuel amount Dinj is integrated continues when INIaccp≧Aaccp>ENDaccp is satisfied.

In the output restricting process of FIG. 2, after the reading of the fuel integrated value Sinj is finished in step S102, it is determined in step S104 whether or not an abnormality is occurring in the drive power output system of the engine is determined. The occurrence of an abnormality is determined from the detection result of an abnormality detection system arranged in the ECU 52. In the present embodiment, abnormalities are classified into abnormality levels 1 to 3, as will be described later. For example, the abnormality level 1 is set as the highest level and includes fuel leakage from the common rail 12 or the like and abnormalities of the ECU 52. The abnormality level 2 is set as the second highest level and includes supercharging abnormalities in the turbo charger 24. The abnormality level 3 is set to the third highest level and includes abnormalities in the acceleration pedal operation amount sensor 58.

When determined that an abnormality is occurring in the drive power output system in step S104, a control amount setting process is executed in step S106. The details of the control amount setting process are shown in the flowchart of FIG. 4.

Figure 4:
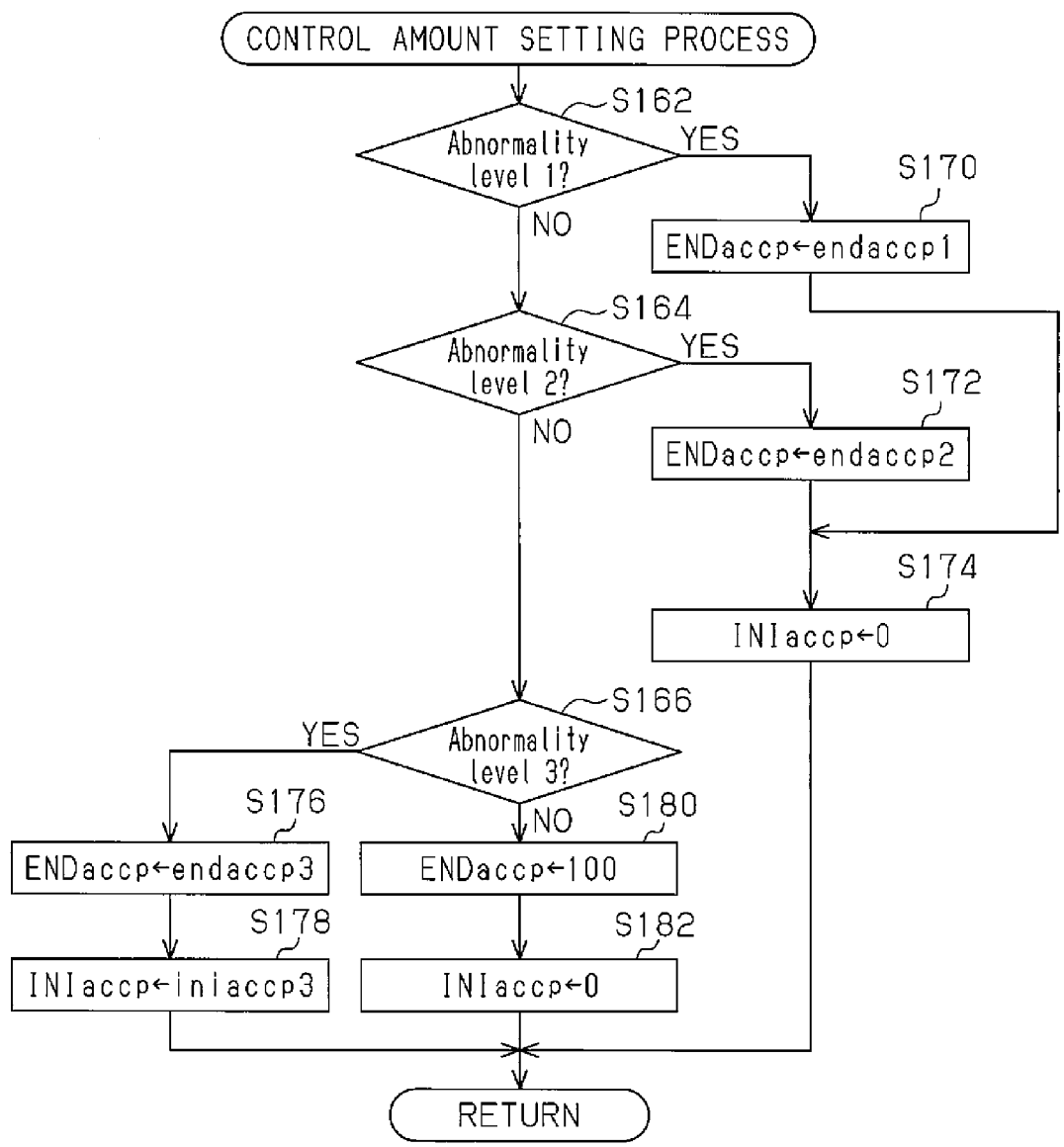
FIG. 4 is a flowchart of a control amount setting process shown in FIG. 2.

When the control amount setting process shown in FIG. 4 starts, in step S162, it is determined whether or not the abnormality is abnormality level 1. When the abnormality is abnormality level 1, in step S170, a level 1 final restriction set value endaccp1 is set as the final restriction value ENDaccp. The level 1 final restriction set value endaccp1 is a value using the acceleration pedal operation amount as the upper limit of the tolerable output range of the engine 2 when the abnormality is abnormality level 1.

In step S174, the initial restriction value INIaccp is cleared (=0%), and the present routine is temporarily terminated.

When the abnormality is not abnormality level 1 in step S162, it is determined whether or not the abnormality is abnormality level 2 in step S164. When the abnormality is abnormality level 2 in step S164, a level 2 final restriction set value endaccp2 is set as the final restriction value ENDaccp in step S172. The level 2 final restriction set value endaccp2 is a value using the acceleration pedal operation amount as the upper limit of the tolerable output range of the engine 2 when the abnormality is abnormality level 2. After the processing of step S172 ends, the initial restriction value INIaccp is cleared in step S174 and the present routine is temporarily terminated.

When the abnormality is not abnormality level 2 in step S164, it is determined whether or not the abnormality is abnormality level 3 in step S166. If the abnormality is abnormality level 3, a level 3 final restriction set value endaccp3 is set as the final restriction value ENDaccp in step S176. The level 3 final restriction set value endaccp3 is a value using the acceleration pedal operation amount as the upper limit of the tolerable output range of the engine 2 when the abnormality is abnormality level 3.

In step S178, a level 3 initial restriction set value iniaccp3 is set as the initial restriction value INIaccp. The level 3 initial restriction set value iniaccp3 is a value using the acceleration pedal operation amount as the upper limit of the tolerable output range of the engine 2 in an initial state of an abnormality when the abnormality is abnormality level 3. The present routine is temporarily terminated after the process of step 178 ends.

When the abnormality is not abnormality level 3 in step S166, in step S180, 100 (%), which is a value serving as an initial value, is set as the final restriction value ENDaccp. In step S182, the initial restriction value INIaccp is cleared (=0%), and then the present routine is temporarily terminated. When the abnormality does not correspond to any of the abnormality levels 1 to 3, the initial values are set as the final restriction value ENDaccp and initial restriction value INIaccp so that engine output is not restricted.

After the processes shown in FIG. 4 are terminated, in step S108 of the output restricting process shown in FIG. 2, it is determined whether or not the current acceleration pedal operation amount restriction value Aaccp is less than or equal to the initial restriction value INIaccp.

In a state immediately before an abnormality occurs, the acceleration pedal operation restriction value Aaccp is in a normal state, and 100% is set for this value as an initial setting. Accordingly, for abnormality level 3 in which the initial restriction value INIaccp (<100%, e.g., 70% to 80%) is set, when first determined that an abnormality has occurred, Aaccp>INIaccp is satisfied and a negative determination is given in step S108. For abnormality levels 1 and 2, INIaccp=0 is constantly satisfied. This satisfies Aaccp>INIaccp and a negative determination is given in step S108.

If a negative determination is given in step S108, it is determined whether or not the abnormality is abnormality level 3 in step S110. If the abnormality is abnormality level 1 or 2, a new acceleration pedal operation amount restriction value Aaccp for an abnormality is calculated from expression 3 to restrict the output when there is an abnormality in step S112.

$$Aaccp \rightarrow MAX(ENDaccp, Aaccp-daccp) \quad \text{[Expression 3]}$$

MAX(ENDaccp, Aaccp−daccp) is an operator that takes a larger one of the value ENDaccp and the value Aaccp−daccp when these values are different and extracts either one of the value ENDaccp and the value Aaccp−daccp value when they are the same. A gradual reduction value daccp is a value for continuously decreasing the acceleration pedal operation amount restriction value Aaccp in the control cycle (constant time cycle) of the routine shown in FIG. 2.

Expression 3 is the same process as expression 4 as long as a value obtained by decreasing the acceleration pedal operation amount restriction value Aaccp by the gradual reduction value daccp is greater than the final restriction value ENDaccp (e.g., 10 to 25%). Further, expression 3 is a process for continuously decreasing the acceleration pedal operation amount restriction value Aaccp in the time cycle (gradual reduction process).

$$Aaccp \rightarrow Aaccp-daccp \quad \text{[Expression 4]}$$

After repeating the gradual reduction process described above, when the value obtained by decreasing the acceleration pedal operation amount restriction value Aaccp by the gradual reduction value daccp becomes less than the final restriction value ENDaccp, the right side of expression 3 becomes the final restriction value ENDaccp. Thus, the value of the final restriction value ENDaccp thereafter is continuously set as the acceleration pedal operation amount restriction value Aaccp in the process of expression 3.

After the acceleration pedal operation amount restriction value Aaccp is set in step S112, the final acceleration pedal operation amount accpf is set as shown in expression 4 in step S126.

$$accpf \rightarrow MIN(accpt, Aaccp) \quad \text{[Expression 5]}$$

Here, MIN(accpt, Aaccp) is an operator that takes a smaller number of the value accpt and the value Aaccp when these values are different and extracts either one of the value accpt and the value Aaccp when these values are the same. Through expression 5, using the acceleration pedal operation amount restriction value Aaccp as the upper limit, the final acceleration pedal operation amount accpf, which is reflected on the actual output, is calculated based on the driver's acceleration pedal operation amount accpt operated by the driver. In other words, the value of the final acceleration pedal operation amount accpf is restricted by the acceleration pedal operation amount restriction value Aaccp.

Figure 5:
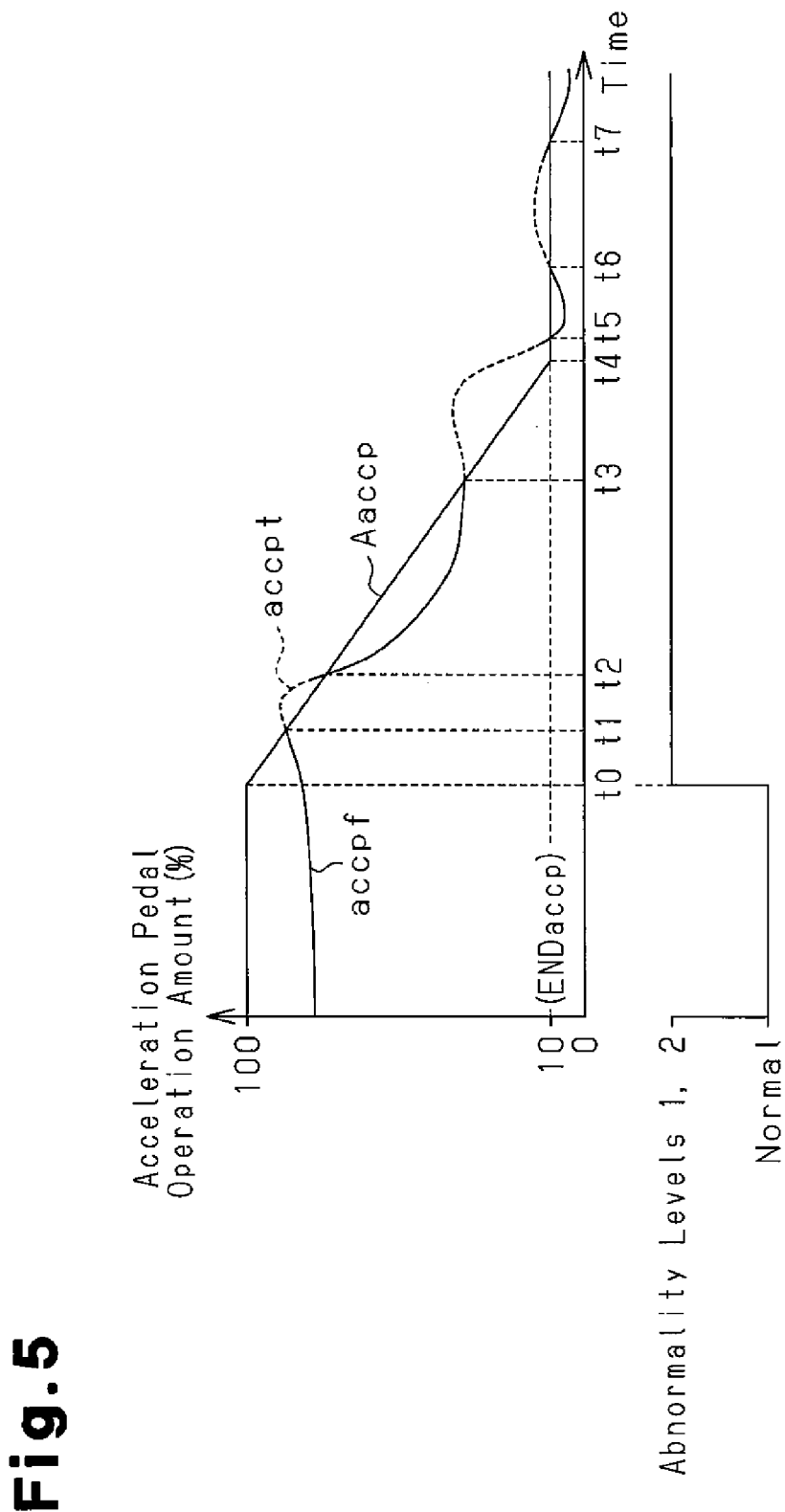
FIG. 5 is a timing chart showing one example of the output restricting process shown in FIG. 2.

As shown in the timing chart of FIG. 5, in the cases of abnormality levels 1 and 2, as time elapses, the acceleration pedal operation amount restriction value Aaccp decreases from 100% to 10% (=final restriction value ENDaccp) when an abnormality occurs at time t0. The acceleration pedal operation amount restriction value Aaccp becomes constant when Aaccp=10% is satisfied at time t4. By setting of the acceleration pedal operation amount restriction value Aaccp in this manner, even if the driver determines the acceleration pedal operation amount accpt, the portion where the acceleration pedal operation amount accpt exceeds the acceleration pedal operation amount restriction value Aaccp (t1 to t2, t3 to t5, t6 to t7) is restricted by the acceleration pedal operation amount restriction value Aaccp, which is the upper limit as shown by the broken line.

If the abnormality is abnormality level 3 in step S110 of FIG. 2, a new acceleration pedal operation amount restriction value Aaccp is calculated when there is an abnormality through expression 6 in step S114. The acceleration pedal operation amount restriction value Aaccp obtained through expression 6 is used to restrict the acceleration pedal operation amount when there is an abnormality.

$$Aaccp \rightarrow MAX(INIaccp, Aaccp - daccp) \quad \text{[Expression 6]}$$

The operator represented by MAX( ) and the gradual reduction value daccp are basically the same as the operator MAX ( ) and the gradual reduction value daccp of expression 3 used in step S112. However, the value of the gradual reduction value daccp for the abnormality level 3 differs from that for the abnormality levels 1 and 2. Although the parameters used in expression 6 are different, expression 6 executes a process similar to expression 3. In other words, the process is the same as expression 4 as long as the value obtained by decreasing the acceleration pedal operation amount restriction value Aaccp by the gradual reduction value daccp is greater than the initial restriction value INIaccp, in which case the acceleration pedal operation amount restriction value Aaccp is continuously decreased in time cycles.

After repeating the gradual reduction process described above, when the value obtained by decreasing the acceleration pedal operation amount restriction value Aaccp by the gradual reduction value daccp becomes less than the initial restriction value INIaccp, the right side of expression 6 becomes the initial restriction value INIaccp. That is, Aaccp=INIaccp is satisfied.

After the acceleration pedal operation amount restriction value Aaccp is set in step S114, the final acceleration pedal operation amount accpf is set in step S126, as shown in expression 5. The present routine is temporarily terminated when the process of step S126 ends.

When Aaccp=INIaccp is satisfied by repeating the process of expression 6 in step S114, a positive determination is given in step S108. Accordingly, it is then determined whether or not the acceleration pedal operation amount restriction value Aaccp is greater than the final restriction value ENDaccp in step S116. Initially, the initial restriction value INIaccp, which is greater than the final restriction value ENDaccp, is set as the acceleration pedal operation amount restriction value Aaccp. Therefore, Aaccp>ENDaccp is satisfied, and the process proceeds to step S118. In step S118, the gradual reduction process of the acceleration pedal operation amount restriction value Aaccp corresponding to the fuel integrated value Sinj is executed through expression 7.

$$Aaccp \rightarrow INIaccp - F(Sinj, Tinj) \quad \text{[Expression 7]}$$

Here, F(Sinj, Tinj) represents a calculation process for gradually decreasing the acceleration pedal operation amount restriction value Aaccp from the value of the initial restriction value INIaccp as the fuel integrated value Sinj increases. In the present embodiment, the reduction starts from the initial restriction value INIaccp. When the acceleration pedal operation amount restriction value Aaccp reaches the final restriction value ENDaccp, the fuel integrated value Sinj reaches a total fuel injection amount reference value Tinj. The total fuel injection amount reference value Tinj corresponds to the total fuel amount, which is the physical quantity corresponding to the total workload, and is represented by the total fuel amount corresponding to the acceleration pedal operation amount that is greater than the final restriction value ENDaccp of the fuel amount combusted in the engine 2 when INIaccp≧Aaccp>ENDaccp is satisfied.

The arithmetic expression of expression 8 may be used for F(Sinj, Tinj).

$$F(Sinj, Tinj) = (Sinj/Tinj) \times (INIaccp - ENDaccp) \quad \text{[Expression 8]}$$

After the acceleration pedal operation amount restriction value Aaccp is set in step S118, the final acceleration pedal operation amount accpf is set as shown in expression 5 in step S126, and the present routine is temporarily terminated.

Subsequently, the acceleration pedal operation amount restriction value Aaccp gradually decreases and approaches the final restriction value ENDaccp as the fuel integrated value Sinj increases by repeating the process of expression 7. The acceleration pedal operation amount restriction value Aaccp calculated in expression 7 becomes the same as the final restriction value ENDaccp when the fuel integrated value Sinj reaches the total fuel injection amount reference value Tinj. Accordingly, a negative determination is given in step S116. Thus, the acceleration pedal operation amount restriction value Aaccp does not further decrease and becomes constant in a state in which acceleration pedal operation amount restriction value Aaccp=ENDaccp is satisfied. Due to such a constant state, the final acceleration pedal operation amount accpf is restricted by the final restriction value ENDaccp in step S126.

Figure 6:
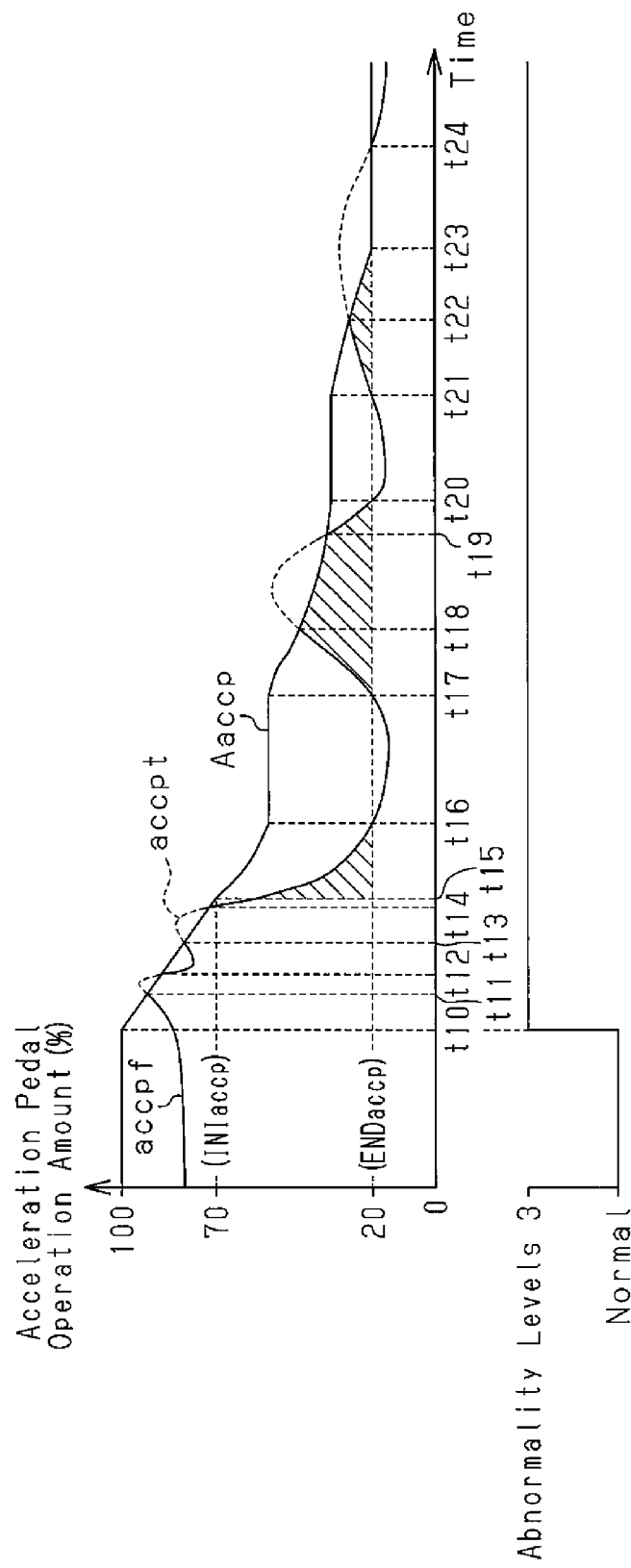
FIG. 6 is a timing chart showing one example of the output restricting process shown in FIG. 2.

As shown in the timing chart of FIG. 6, in the case of abnormality level 3, as time elapses, the acceleration pedal operation amount restriction value Aaccp decreases from 100% to 70% (=INIaccp) when an abnormality occurs at time t10 and satisfies Aaccp=70% at time t15. The acceleration pedal operation amount restriction value Aaccp decreases from 70% to 20% (=ENDaccp) in correspondence to the increase of the fuel integrated value Sinj, that is, in accordance with the operation history of the internal combustion engine between time t15 to time t23. The increase of the fuel integrated value Sinj is the result of integrating the fuel injection amount (final restriction excess fuel amount Dinj) corresponding to the portion where the final acceleration pedal operation amount accpf exceeds the final restriction value ENDaccp at time t15 to t16, t17 to t20, and t21 to t23, as shown by hatching lines.

After the acceleration pedal operation amount restriction value Aaccp reaches 20% (=ENDaccp) at time t23, the acceleration pedal operation amount restriction value Aaccp becomes constant at the value of the final restriction value ENDaccp (20% in FIG. 6).

Figure 7:
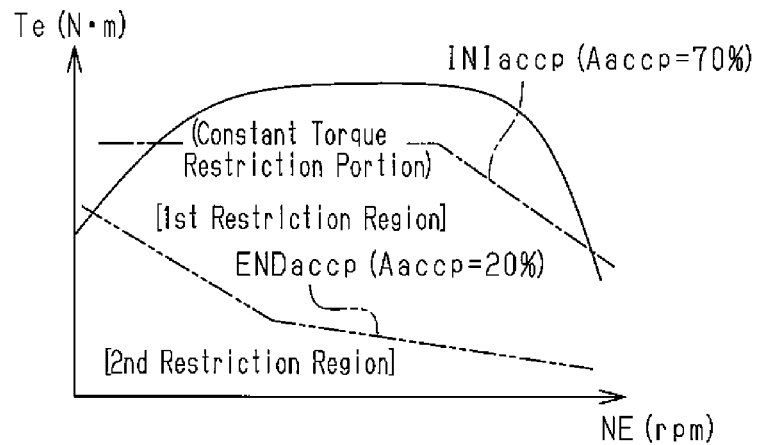
FIG. 7 is a graph showing the arrangement of a first restriction region and second restriction region related to the output restricting process shown in FIG. 2.

This is shown by the relationship of the engine speed NE and the engine output torque Te in FIG. 7. In FIG. 7, the torque restriction by a constant torque is added to the initial restriction value INIaccp. When an abnormality level 3 occurs, the engine output torque Te is restricted to a region (first restriction region) that is lower than the upper limit (single dash line) corresponding to the initial restriction value INIaccp (70%). Then, when the upper limit decrease as the fuel integrated value Sinj increases and becomes Sinj=Tinj, the engine output torque Te is restricted to a region (second restriction region) that is lower than the upper limit (double dash line) corresponding to the final restriction value ENDaccp (20%).

If an abnormality has not occurred in the drive power output system in step S104 of the output restricting process of FIG. 2, it is determined whether or not a recovery from an abnormality has been made in step S120. When the recovery from an abnormality has not been made, the final acceleration pedal operation amount accpf is restricted by the acceleration pedal operation amount restriction value Aaccp, which is still 100% as initially set, in step S126. In other words, the acceleration pedal operation amount accpf is substantially not restricted, and the acceleration pedal operation amount accpt, which is determined by the driver, is directly reflected on the final acceleration pedal operation amount accpf.

When a recovery from an abnormality is being made in step S120, that is, when the acceleration pedal operation amount restriction value is Aaccp<100%, it is determined whether or not the acceleration pedal operation amount accpt, which is determined by the driver, is greater than or equal to the acceleration pedal operation amount restriction value Aaccp in step S122. When accpt Aaccp is satisfied, the acceleration pedal operation amount restriction value Aaccp is gradually increased in accordance with expression 9 in step S124.

$$Aaccp \rightarrow MIN(100, Aaccp + maccp) \quad \text{[Expression 9]}$$

Expression 9 indicates that the acceleration pedal operation amount restriction value Aaccp is increased for every control cycle by a gradual increase value maccp, ultimately reaches 100%, and becomes constant. When Aaccp=100% is satisfied, a negative determination is given in step S120 assuming that recovery from the abnormality is not being made, that is, the recovery is completed. If accpt<Aaccp is satisfied in step S122, expression 9 is not performed.

In the structure described above, the ECU 52 corresponds to an abnormality detection unit, an initial restriction unit, and the secondary restriction unit. The processing performed by the abnormality detection system in the ECU 52 corresponds to the processing performed by the abnormality detection unit. Steps S108, S110, S114, S126, S166, and S178 correspond to processes performed by the initial restriction unit. Steps S108, S116, S118, S126, S152 to S158, S166, and S176 correspond to processes performed by the secondary restriction unit.

The first embodiment described above has the advantages described below.

(1) In an initial state of an abnormality in abnormality level 3, the acceleration pedal operation restriction value Aaccp readily converges to the initial restriction value INIaccp as time elapses in step S114. Accordingly, the tolerable output range of the engine 2 is restricted to the first restriction region in which the upper limit is set by the initial restriction value INIaccp. Thus, the engine 2 is prevented from being stopped within a short period immediately after an abnormality occurs by restricting the output state of the engine 2 to the first restriction region in the initial state of an abnormality.

Further, the acceleration pedal operation amount restriction value Aaccp is then shifted from the initial restriction value INIaccp to the final restriction value ENDaccp in accordance with the operation history of the engine 2.

As described above, instead of directly shifting the tolerable output range of the engine 2 to the second restriction region when there is an abnormality, the tolerable output range of the engine 2 is first shifted to the first restriction region, which has an upper limit that is higher than the second restriction region, to prevent abnormal stopping of the engine 2. Then, the tolerable output range is shifted to the second restriction region, which is desirable for the vehicle evacuation travel, while using a high engine output region as much as possible.

Thus, a certain extent of engine output is ensured even if it is immediately after an abnormality occurs. Further, when an abnormality occurs, the vehicle completes the evacuation travel without the driver feeling uncomfortable.

(2) During shifting of the restriction region, the possibility of abnormal stopping or the like increases in the engine 2 as the engine output state continues to be higher than the second restriction region by the driving operation of the driver during the vehicle evacuation travel. Thus, the output state of the engine 2 is shifted to the second restriction region in accordance with the operation history of the engine 2, as described above. This prevents an inappropriate state from continuing over a long period of time and allows the vehicle to complete the evacuation travel.

In particular, the tolerable output range of the engine 2 is shifted from the first restriction region to the second restriction region in accordance with an increase in the fuel integrated value Sinj using the fuel integrated value Sinj, which is a physical quantity corresponding to the total workload of the engine 2 (total workload exceeding the second restriction region) for the operation history. This enables accurate recognition of a state in which the output control is inappropriate due to the driving operation etc. of the driver during the evacuation travel.

Therefore, the engine operation state, which is in an output state higher than the second restriction region, is positively reflected on the evacuation travel to allow smooth evacuation travel. This ensures protection of the engine 2 while completing the evacuation travel.

Second Embodiment

The structure of the present embodiment is the same as the first embodiment except for step S116 of the output restricting process of FIG. 2 performed when the engine has an abnormality.

Figure 8:
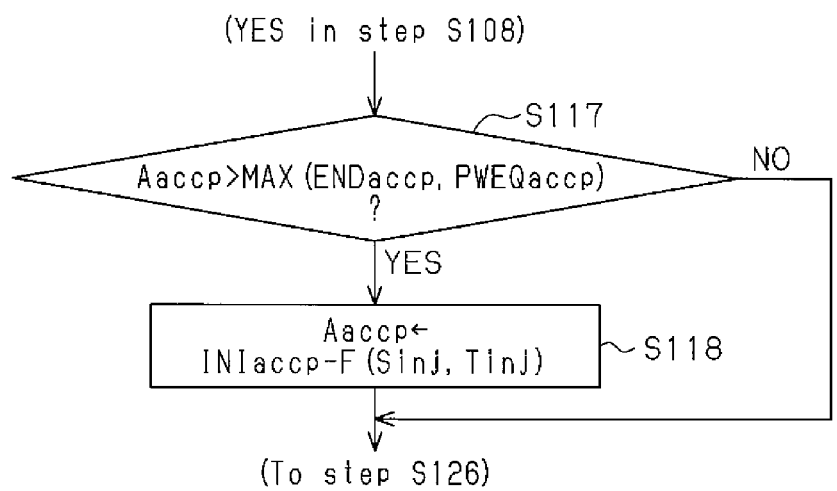
FIG. 8 is a flowchart showing part of the output restricting process according to a second embodiment executed by the ECU shown in FIG. 1.

FIG. 8 shows part of the output restricting process when there is an abnormality in the present embodiment. The process of step S117 is performed in lieu of the process of step S116 in FIG. 2.

Specifically, after the acceleration pedal operation amount restriction value Aaccp reaches the initial restriction value INIaccp (refer to FIG. 2) in step S108, a determination based on expression 10 is given in step S117.

$$Aaccp > MAX(ENDaccp, PWEQaccp) \qquad \text{[Expression 10]}$$

An equal output acceleration pedal operation amount PWEQaccp is an upper limit value representing the equal output set in advance for the vehicle evacuation travel. The equal output acceleration pedal operation amount PWEQaccp corresponds to the position of the equal output line, as shown by a broken line in FIG. 9, in a two-dimensional space represented by the engine output torque Te and the engine speed NE. The equal output acceleration pedal operation amount PWEQaccp is set as a value at which a constant output (kW) is obtained so as to allow for sufficient climbing of a hill having a gradient of a certain extent.

Expression 10 is an expression for determining whether the acceleration pedal operation amount restriction value Aaccp is large compared to a larger one of the final restriction value ENDaccp and the equal output acceleration pedal operation amount PWEQaccp, which obtains the constant output.

Figure 9:
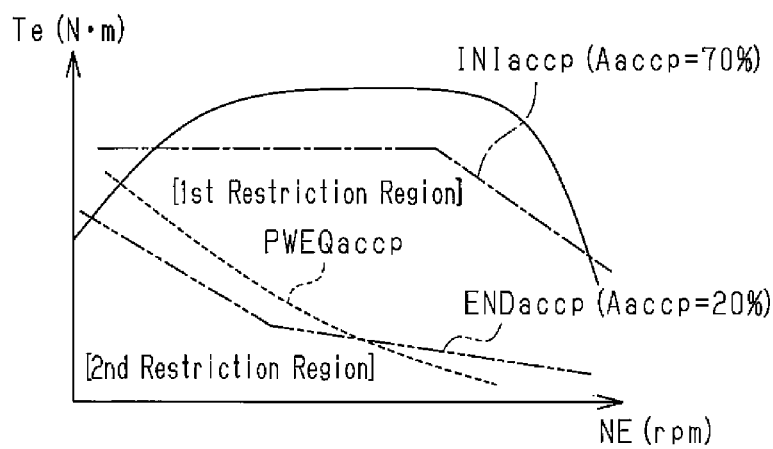
FIG. 9 is a graph showing the arrangement of a first restriction region and second restriction region related to the output restricting process shown in FIG. 8.

Since ENDaccp>PWEQaccp is satisfied at the high side of the engine speed NE in FIG. 9, step S117 is the same determination process as step S116 of FIG. 2, that is, a process for determining whether the acceleration pedal operation amount restriction value Aaccp is greater than the final restriction value EENDaccp. However, since ENDaccp<PWEQaccp is satisfied at the low side of the engine speed NE. Thus, step S117 is a process for determining whether or not the acceleration pedal operation amount restriction value Aaccp is greater than the equal output acceleration pedal operation amount PWEQaccp.

Accordingly, even when the acceleration pedal operation amount restriction value Aaccp finally converges to the second restriction region and a negative determination is made in S117, the engine output that achieves the final acceleration pedal operation amount accpf, which is restricted by the acceleration pedal operation amount restriction value Aaccp, enabling generation of an output level (kW) enabling the climbing of a hill having a planned gradient.

In the above-described structure, the ECU 52 corresponds to the abnormality detection unit, the initial restriction unit, and the secondary restriction unit. The process of the abnormality detection system arranged in the ECU 52 corresponds to the process performed by the abnormality detection unit. Steps S108, S110, S114, S126, S166, and S178 correspond to the processes performed by the initial restriction unit. Steps S108, S117, S118, S126, S152 to S158, S166, and S176 correspond to the processes performed by the secondary restriction unit.

The second embodiment has the advantages described below.

(1) The same advantages as the first embodiment are obtained.

(2) The second restriction region is a region including the output region that is less than or equal to the equal output line. Thus, the output of the engine 2 does not become insufficient even when climbing a hill, and the vehicle easily completes the evacuation travel.

Other Embodiments

Figure 10:
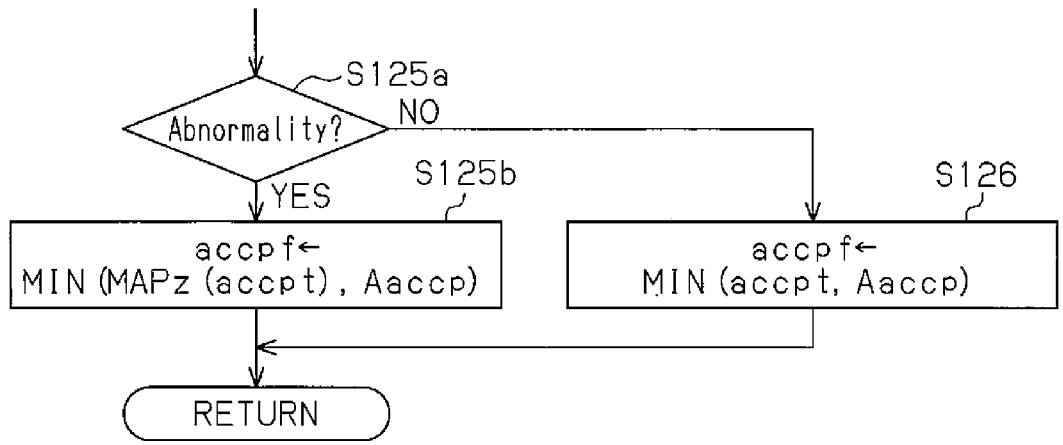
FIG. 10 is a flowchart showing part of the output restricting process according to a further embodiment.

In each of the embodiments described above, the operation sensitivity for the acceleration pedal operation amount sensor 58 may be lowered when there is an abnormality. For instance, the process of step S126, which is the output restricting process of FIG. 2, may be replaced with the process shown in FIG. 10.

Specifically, it may be determined whether or not an abnormality occurred in the drive power output system in step S125a immediately after one of the process of step S114, the process of S112, the negative determination of S116, the process of S118, the negative determination of S120, the negative determination of S122, and the process of S124. If an abnormality is not occurring, the process of step S126 is executed with expression 5 as described in the first embodiment.

When there is an abnormality, the final acceleration pedal operation amount accpf is set using expression 11 in step S125b.

$$accpf \rightarrow MIN(MAPz(accpt), Aaccp) \qquad \text{[Expression 11]}$$

Figure 11:
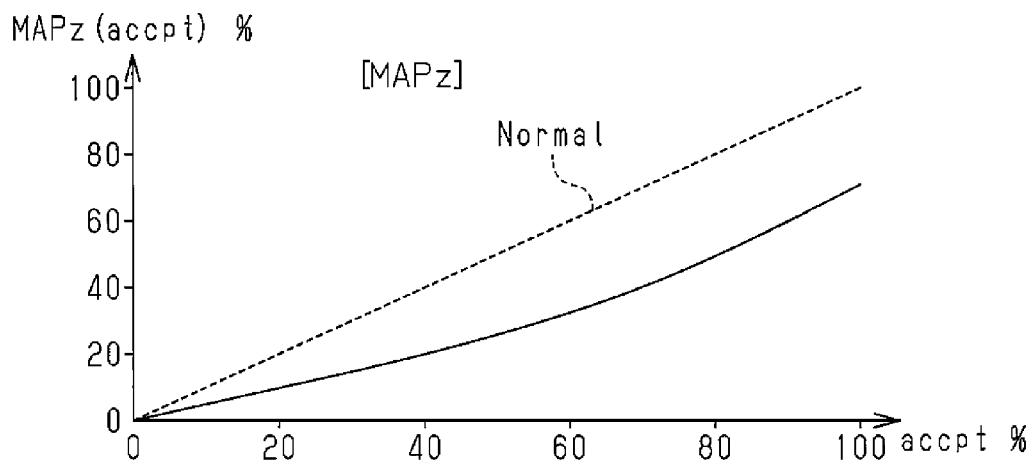
FIG. 11 is an explanatory diagram showing a operation sensitivity lowering map according to a further embodiment.

In expression 11, the acceleration pedal operation amount accpt, which serves as a driver instruction operation amount detected by the acceleration pedal operation amount sensor 58, is not used. This point differs from expression 5. In expression 11, in lieu of the acceleration pedal operation amount accpt, the operation sensitivity for the acceleration pedal operation amount accpt is lowered by the operation sensitivity lowering map MAPz, which is shown by the solid line in FIG. 11. In other words, a comparison with the normal output value shown by the broken line is performed, a lowering correction is executed on the output value of the acceleration pedal operation amount accpt, and the value of MAPz (accpt) is kept lower than the value of the acceleration pedal operation amount accpt.

Figure 12:
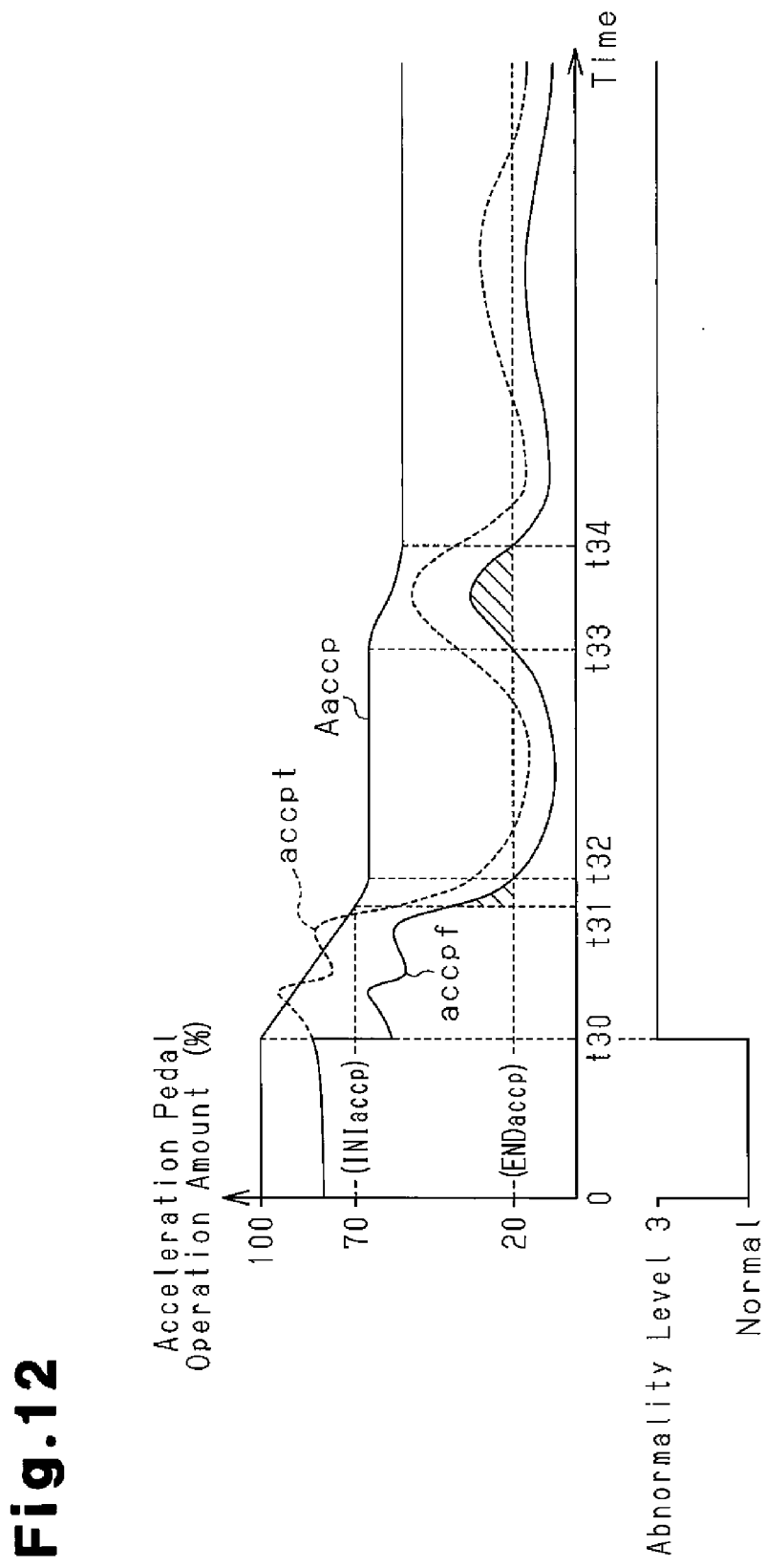
FIG. 12 is a timing chart showing one example of an output controlling process according to a further embodiment.

As shown in the timing chart of FIG. 12, when an abnormality occurs at time t30, the above-described operation sensitivity lowering process is executed to immediately lower and correct the final acceleration pedal operation amount accpf based on the operation sensitivity lowering map MAPz. This shifts the line of the final acceleration pedal operation amount accpf at values lower than the line of the first embodiment shown in FIG. 6. Thus, the integration of the fuel integrated value Sinj is performed at timings t31 to t32 and t33 to t34, and the acceleration pedal operation amount restriction value Aaccp is gradually reduced during such periods.

In addition to the advantages of the first and second embodiments, the present embodiment has an advantage in that the driver feel operational awkwardness when there is an abnormality since the operation sensitivity is lowered. Accordingly, the driver recognizes an abnormality without feeling greatly uncomfortable. This allows the driver to recognize an abnormality at an early stage and promptly transit the vehicle to the evacuation travel even without noticing the activation of an abnormality lamp or the like.

In each of the embodiments described above, the output may be temporarily lowered when there is an abnormality. The output may be lowered by cutting fuel. For example, the process of step S106 in FIG. 2 may be replaced by the process shown in FIG. 13.

Figure 13:
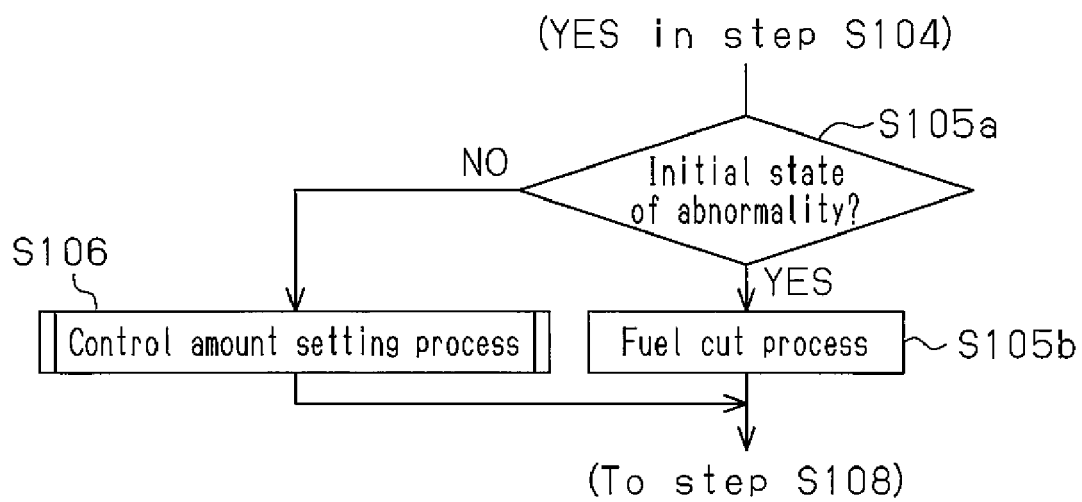
FIG. 13 is a flowchart showing part of the output restricting process according to another embodiment.

In detail, if an abnormality occurs in the drive power output system in step S104 of FIG. 2, it is determined whether or not the abnormality is in an initial state in step S105a of FIG. 13. When it is the initial state of an abnormality, the fuel cut process is executed in step S105b. As shown in the timing chart of FIG. 14, the final acceleration pedal operation amount accpf is set to "0" during a period (t40 to t41) to temporarily stop combustion in the engine 2 and produce a temporary shock based on the vehicle acceleration feel or combustion noise elimination. After the initial period of the abnormality in step S105a, the control amount setting process (see FIG. 4) described in the first embodiment is executed in step S106.

In such a structure, in addition to the advantages of the first and second embodiments, the driver may temporarily feel uncomfortable due to the shock produced in the initial stage of an abnormality. Accordingly, the driver recognizes an abnormality at an early stage even without noticing the activation of an abnormality lamp or the like. This allows the driver to promptly transit the vehicle to the evacuation travel.

Instead of cutting fuel, the shock, which is based on the vehicle acceleration feel or reduction in combustion noise may be produced by temporarily decreasing the acceleration pedal operation amount restriction value Aaccp to be less than the restriction value obtained in step S114.

In a diesel engine, a response lowering process is executed for the fuel injection amount with respect to the driver's operation amount through a variation gradient restriction, a primary delay process, a movement average process, or the like when in transition periods to improve drivability in a normal state. Accordingly, instead of cutting fuel, the drivability may be lowered temporarily or throughout the entire abnormality period by reducing the amount of decrease in response during the response lowering process, or stopping the response lowering process. This results in the driver feeling somewhat uncomfortable and allows the driver to recognize an abnormality at an early stage and promptly transit the vehicle to the evacuation travel even without noticing the activation of an abnormality lamp or the like.

When advancing the fuel injection timing or when performing pilot injection, instead of cutting fuel, the combustion noise may be increased by stopping advancement of the fuel injection timing or stopping pilot injection. This increase in noise results in the driver feeling somewhat uncomfortable and allows the driver to recognize an abnormality at an early stage and promptly transit the vehicle to the evacuation travel even without noticing the activation of an abnormality lamp or the like.

When in abnormality level 3, the process of step S114 for shifting the acceleration pedal operation amount restriction value Aaccp to the initial restriction value INIaccp is performed as time elapses. However, a process for shifting to the initial restriction value INIaccp may immediately be performed. This results in the driver feeling somewhat uncomfortable and allows the driver to recognize an abnormality at an early stage and promptly transit the vehicle to the evacuation travel even without noticing the activation of an abnormality lamp or the like.

When in abnormality level 3, the process (S116, S118, or S117, S118) for shifting the acceleration pedal operation amount restriction value Aaccp from the initial restriction value INIaccp to the final restriction value ENDaccp side is continuously executed based on the fuel integrated value Sinj. Instead, the acceleration pedal operation amount restriction value Aaccp may be shifted in a stepped manner whenever the fuel integrated value Sinj is increased by a certain amount.

When in abnormality level 3, the process for shifting the acceleration pedal operation amount restriction value Aaccp from the initial restriction value INIaccp to the final restriction value ENDaccp is executed so as to reach the final restriction value ENDaccp when the fuel integrated value Sinj reaches the total fuel injection amount reference value Tinj. Instead, the total fuel injection amount reference value Tinj may be eliminated, and the acceleration pedal operation amount restriction value Aaccp may be gradually shifted from the initial restriction value INIaccp to the final restriction value ENDaccp simply in accordance with the increase in the fuel integrated value Sinj.

The fuel integrated value Sinj is obtained by integrating the fuel injection amount corresponding to the amount exceeding the final restriction value ENDaccp of the final acceleration pedal operation amount accpf. However, the fuel integrated value Sinj may be obtained by integrating the final acceleration pedal operation amount accpf to control the shifting of the acceleration pedal operation amount restriction value Aaccp.

As shown in FIGS. 7 and 9, the acceleration pedal operation amount restriction value Aaccp corresponds to the upper limit value in the two-dimensional space based on the engine speed NE and the engine output torque Te. This forms the first restriction region and the second restriction region. Instead, the acceleration pedal operation amount restriction value Aaccp may be applied to a two-dimensional space of the engine speed NE and the fuel amount supplied for combustion in the engine 2.

In each of the embodiments discussed above, the diesel engine is described as an internal combustion engine. However, the present invention is also applicable to a gasoline engine. This would obtain the same advantages as the above embodiments.

In each of the embodiments discussed above, the initial restriction value INIaccp is a restriction value based on the acceleration pedal operation amount and includes a constant torque limit. However, the initial restriction value INIaccp may be a limit based on only the acceleration pedal operation amount or only the torque.

The invention claimed is:

1. An output restriction device for restricting engine output when a drive power output system for an internal combustion engine has an abnormality, the output restriction device comprising:
   an abnormality detection unit that detects an abnormality in the drive power output system;
   an initial restriction unit that restricts a tolerable range of the engine output to a first restriction region when the abnormality detection unit detects an abnormality in the drive power output system; and
   a secondary restriction unit that shifts the tolerable range of the engine output to a second restriction region, which has an upper limit lower than that of the first restriction region, in accordance with an operation history of the engine after the initial restriction unit restricts the tolerable range of the engine output to the first restriction region, wherein as the operation history of the engine, the secondary restriction unit uses a total workload of the engine in excess of the second restriction region after the initial restriction unit restricts the tolerable range of the engine output to the first restriction region to shift the tolerable range of the engine output from the first restriction region to the second restriction region in accordance with an increase in the total workload.

2. The output restriction device according to claim 1, wherein the first restriction region is a region avoiding immediate disablement of operation of the engine when there is an abnormality in the drive power output system, and the second restriction region is a region enabling a vehicle evacuation travel for a long time even when there is an abnormality in the drive power output system.

3. The output restriction device according to claim 1, wherein the engine output is restricted based on an operation amount of an accelerator in a vehicle when there is an abnormality in the drive power output system; and
   the second restriction region is a region including an output region that is less than or equal to a predetermined equal output line.

4. The output restriction device according to claim 1, wherein the shifting of the tolerable range of the engine output from the first restriction region to the second restriction region is completed when the total workload of the engine reaches a predetermined reference total workload after the initial restriction unit restricts the tolerable range of the engine output to the first restriction region.

5. The output restriction device according to claim 1, wherein a total fuel amount supplied for combustion in the engine after the initial restriction unit restricts the tolerable range of the engine output to the first restriction region is used as a physical quantity corresponding to the total workload.

6. The output restriction device according to claim 2, wherein the engine output is restricted based on an operation amount of an accelerator in a vehicle when there is an abnormality in the drive power output system; and
   the second restriction region is a region including an output region that is less than or equal to a predetermined equal output line.

7. The output restriction device according to claim 6, wherein the shifting of the tolerable range of the engine output from the first restriction region to the second restriction region is completed when the total workload of the engine reaches a predetermined reference total workload after the initial restriction unit restricts the tolerable range of the engine output to the first restriction region.

8. The output restriction device according to claim 7, wherein a total fuel amount supplied for combustion in the engine after the initial restriction unit restricts the tolerable range of the engine output to the first restriction region is used as a physical quantity corresponding to the total workload.

9. The output restriction device according to claim 6, wherein a total fuel amount supplied for combustion in the engine after the initial restriction unit restricts the tolerable range of the engine output to the first restriction region is used as a physical quantity corresponding to the total workload.

10. The output restriction device according to claim 2, wherein the shifting of the tolerable range of the engine output from the first restriction region to the second restriction region is completed when the total workload of the engine reaches a predetermined reference total workload after the initial restriction unit restricts the tolerable range of the engine output to the first restriction region.

11. The output restriction device according to claim 10, wherein a total fuel amount supplied for combustion in the engine after the initial restriction unit restricts the tolerable range of the engine output to the first restriction region is used as a physical quantity corresponding to the total workload.

12. The output restriction device according to claim 3, wherein the shifting of the tolerable range of the engine output from the first restriction region to the second restriction region is completed when the total workload of the engine reaches a predetermined reference total workload after the initial restriction unit restricts the tolerable range of the engine output to the first restriction region.

13. The output restriction device according to claim 12, wherein a total fuel amount supplied for combustion in the engine after the initial restriction unit restricts the tolerable range of the engine output to the first restriction region is used as a physical quantity corresponding to the total workload.

14. The output restriction device according to claim 2, wherein a total fuel amount supplied for combustion in the engine after the initial restriction unit restricts the tolerable range of the engine output to the first restriction region is used as a physical quantity corresponding to the total workload.

15. The output restriction device according to claim 3, wherein a total fuel amount supplied for combustion in the engine after the initial restriction unit restricts the tolerable range of the engine output to the first restriction region is used as a physical quantity corresponding to the total workload.

16. The output restriction device according to claim 4, wherein a total fuel amount supplied for combustion in the engine after the initial restriction unit restricts the tolerable range of the engine output to the first restriction region is used as a physical quantity corresponding to the total workload.

* * * * *